US005294217A

United States Patent [19]

Talacko et al.

[11] Patent Number: 5,294,217

[45] Date of Patent: Mar. 15, 1994

[54] APPARATUS FOR FEEDING POWDER COATING APPARATUS WITH A POWDER-AIR MIXTURE

[75] Inventors: Radovan Talacko, St. Gallen; Maximilian Matt, Marbach, both of Switzerland

[73] Assignee: Wagner International AG, Switzerland

[21] Appl. No.: 897,086

[22] Filed: Jun. 11, 1992

[30] Foreign Application Priority Data

Jun. 28, 1991 [DE] Fed. Rep. of Germany ....... 4121455

[51] Int. Cl.[5] ........ B65G 53/18

[52] U.S. Cl. ........ 406/91; 406/23; 406/173

[58] Field of Search ........ 406/109, 93, 89, 137, 406/138, 173, 91, 23

[56] References Cited

U.S. PATENT DOCUMENTS

| | | | |
|---|---|---|---|
| 3,489,464 | 1/1970 | Delfs | 406/109 X |
| 4,085,975 | 4/1978 | Bilkvist | 406/109 |
| 4,502,819 | 3/1985 | Fujii et al. | 406/93 X |
| 4,586,854 | 5/1986 | Newman et al. | 406/138 X |
| 4,812,086 | 3/1989 | Kopernicky | 406/23 X |
| 4,824,295 | 4/1989 | Sharpless | 406/109 |
| 4,846,608 | 7/1989 | Sanders | 406/173 X |

FOREIGN PATENT DOCUMENTS

| | | |
|---|---|---|
| 3611039 | 8/1987 | Fed. Rep. of Germany . |
| 3729705 | 3/1989 | Fed. Rep. of Germany . |
| 3729728 | 3/1989 | Fed. Rep. of Germany . |
| 3824908 | 2/1990 | Fed. Rep. of Germany . |

*Primary Examiner*—David M. Mitchell
*Assistant Examiner*—Gary C. Hoge
*Attorney, Agent, or Firm*—Hill, Steadman & Simpson

[57] ABSTRACT

An apparatus for feeding powder coating apparatus with a powder-air mixture, whereby the powder is fluidized in a reservoir, the powder-air mixture that has thereby arisen is conveyed to a dosing container via conveyor lines and is prepared in this dosing container. The fluidization air is eliminated from the powder-air mixture coming from the reservoir, the remaining powder is re-fluidized and re-dosed in defined fashion, and the powder-air mixture produced is conveyed to the allocated powder coating apparatus.

9 Claims, 3 Drawing Sheets

APPARATUS FOR FEEDING POWDER COATING APPARATUS WITH A POWDER-AIR MIXTURE

BACKGROUND OF THE INVENTION

The invention is directed to an apparatus for feeding powder coating apparatus with a powder-air mixture.

In electrostatic powder coating apparatus, the applicators, i.e. the powder spray guns, must be supplied with the powder in a form of a powder-air mixture, whereby an optimally uniform distribution and an exact and constant dosing of the powder particles in the powder-air stream are of special significance for a uniform coating.

Usually, the coating powder is prepared in special reservoirs for this purpose. These reservoirs comprise fluidization and conveying means. German Patent 36 11 039 discloses such a reservoir. Given the type of fluidization and conveyor means disclosed therein, it is difficult to undertake an exact conveying and dosing. This disadvantage is aggravated by what are usually long conveyor lines from the generally extremely large powder reservoirs to the remote powder coating apparatus. Further, it is not possible given this and similar, known apparatus to undertake a separate matching for every powder coating apparatus given the connection of a plurality of coating apparatus to a single reservoir, i.e. to match quantity and composition of the powder-air mixture to the respective demands.

SUMMARY OF THE INVENTION

It is therefore an object of the present invention to create a means for supplying powder coating apparatus with whose assistance one succeeds in significantly improving conveying uniformity and metering precision and in supplying a plurality of powder coating apparatus independently from one another with respect to throughput quantity and air proportion of the powder-air mixture proceeding from a single reservoir.

This object is achieved in an apparatus for feeding powder coating apparatus with a powder-air mixture, whereby the powder is fluidized in a powder reservoir and the powder-air mixture thereby arising is conveyed to the powder coating apparatus via an intermediate container that is likewise equipped with a fluidization means, the intermediate container comprising a dosing container closely proximate to the coating apparatus and having a cyclone-like air separator, a fluidization means and a dosing means for producing a dosed powder air mixture, and a convey or means for conveying the dosed powder-air mixture to the powder coating apparatus.

For maintaining a rated moisture value of enamel powder that is conditioned with respect to its temperature and moisture, German Published Application 37 29 705 in fact discloses that additional, moistening fluidization air be added to the conditioned powder-air mixture in a coating container coming from the preparation container when this moisture content drops. The system disclosed therein, however, serves only the purpose of setting the moisture content and the temperature of enamel powder. No separation of the air from the supplied, conditioned powder-air mixture thus ensues in the coating container.

One advantage of the solutions of the invention is that composition and volume of the powder-air stream can be matched to the respectively desired coating quality by separating the air from the incoming powder-air mixture, fluidization and dosing of the remaining powder in a dosing container allocated to a single powder coating apparatus, despite the fact that only a single reservoir is provided for a plurality of powder coating apparatus. It is thereby critical for the dosing precision that the fluidization air is first separated from the powder-air mixture incoming to the reservoir and that the remaining powder is then re-fluidized and re-dosed in defined fashion. A further advantage of the invention derives from the relatively short conveying distance from the dosing container—that can be accommodated in spatial proximity to the coating apparatus given a small structure—to the allocated powder coating apparatus, as a result whereof the conveying uniformity is substantially less deteriorated than given traditional, long conveying lines. Last but not least, the employment of a dosing container enables a powder coating apparatus allocated thereto to be operated even when the reservoir is not conveying, at least for a certain time span dependent on the volume of the dosing container.

BRIEF DESCRIPTION OF THE DRAWINGS

The invention shall be set forth in greater detail below with reference to a preferred exemplary embodiment shown in the drawings. Shown are.

DESCRIPTION OF THE PREFERRED EMBODIMENTS

Figure 1:
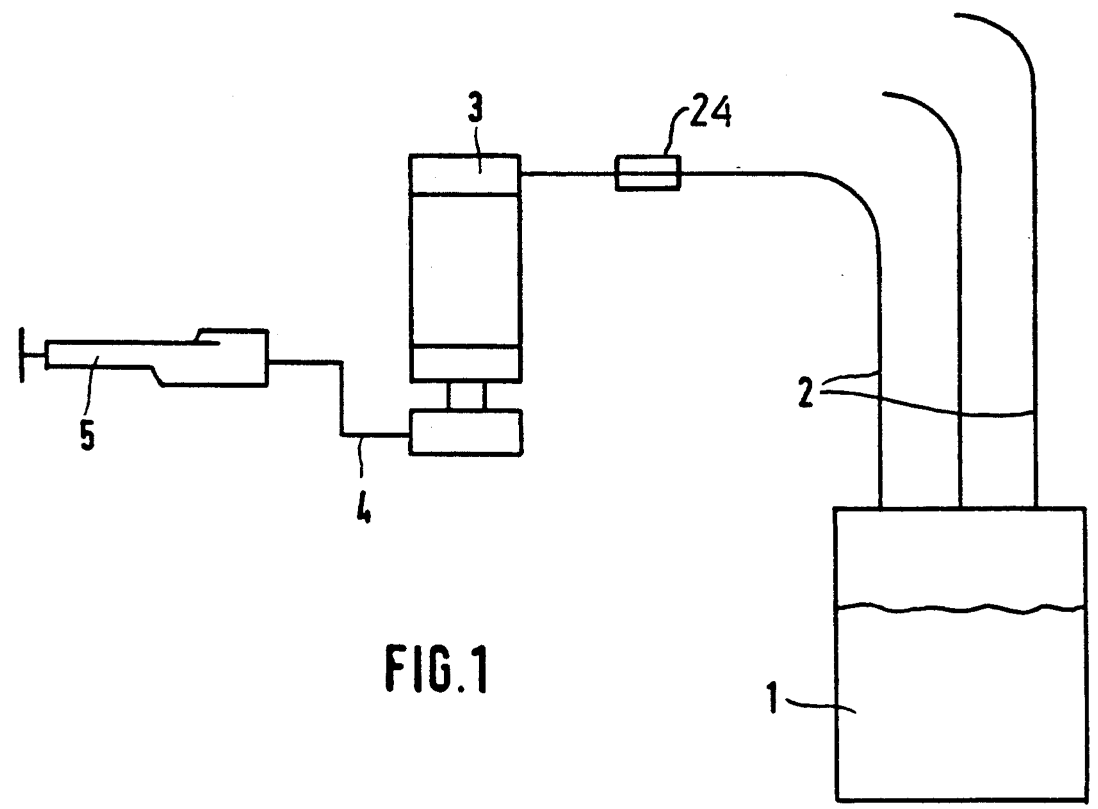
FIG. 1 is a schematic illustration of an apparatus for feeding powder coating apparatus with a powder-air mixture.

FIG. 1 shows a schematic illustration of the apparatus comprising a reservoir 1, conveyor lines 2 and 4, a dosing container 3 and a powder coating apparatus 5. Only one dosing container 3 and one powder coating apparatus 5 are shown in the illustration of FIG. 1. Of course, a plurality of such dosing containers/coating apparatus pairs can also be connected to the reservoir 1. The conveyor line 4 from the dosing container to the powder coating apparatus 5 is usually short compared to the conveyor line 2 from the reservoir 1 to the dosing container 3.

Figure 4:
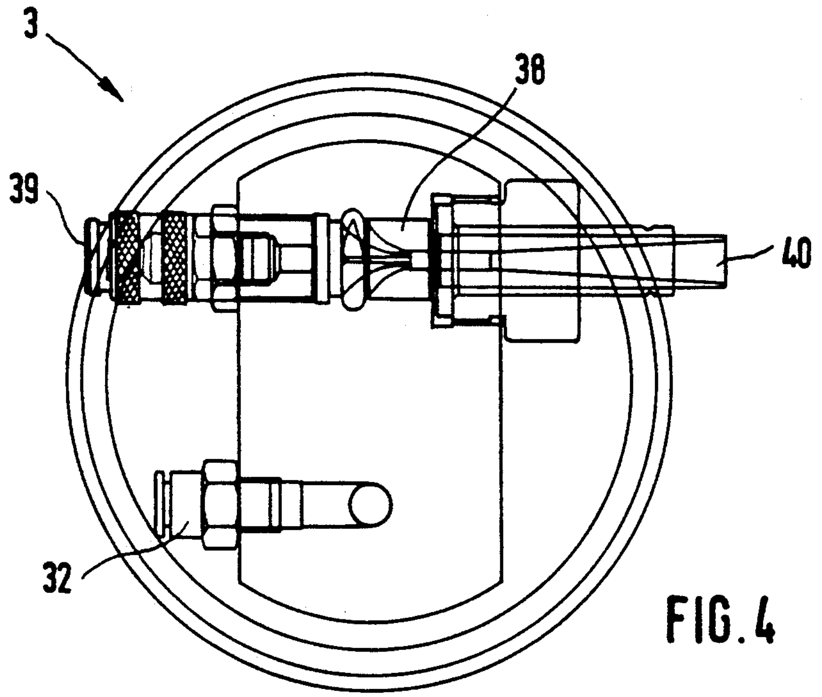
FIG. 4 is a horizontal section through the dosing container of FIG. 2.
Figure 2:
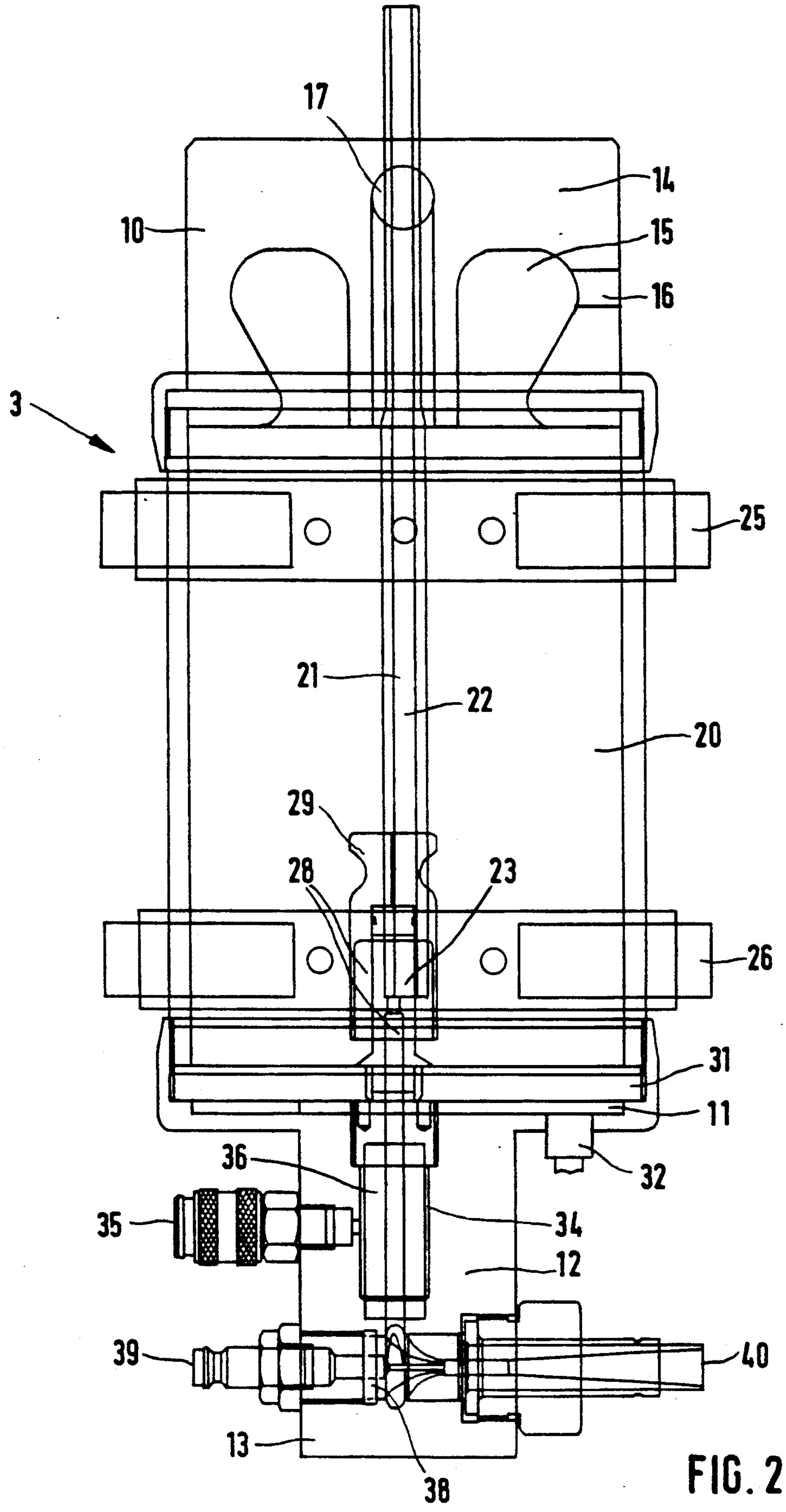
FIG. 2 is a vertical section through the dosing container of FIG. 1.
Figure 3:
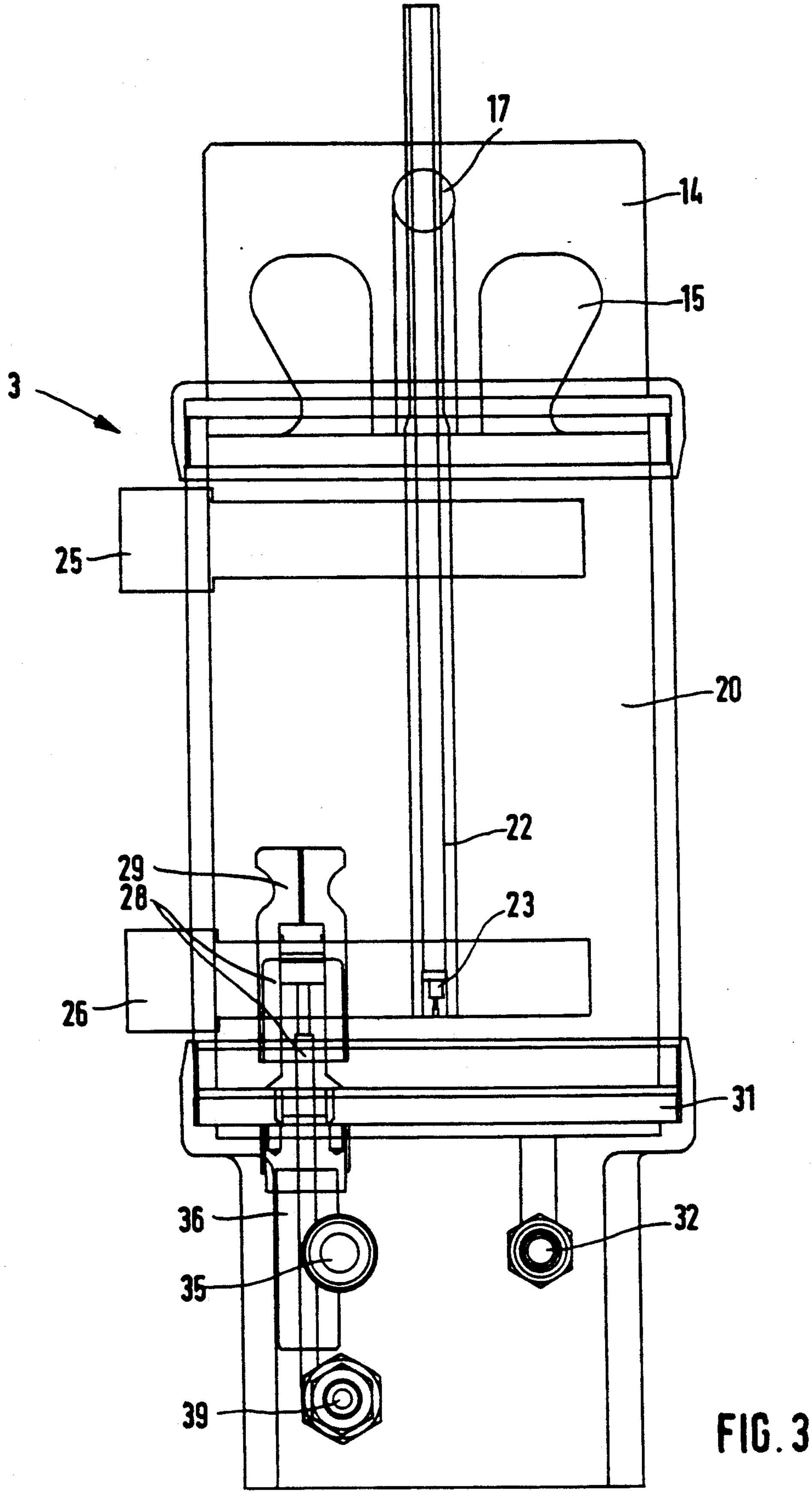
FIG. 3 is a vertical section through the dosing container of FIG. 2 turned by 90°.

The crux of the apparatus for feeding powder coating apparatus with a powder-air mixture is the dosing container 3 shown in greater detail in FIGS. 2 through 4. FIGS. 2 through 4 show various views of the dosing container comprising apparatus 3:

- means for separating the air from the incoming powder-air mixture 10;
- means for fluidizing the remaining powder 11;
- means for dosing the newly produced powder-air mixture 12; and
- means for continued conveying of the dosed powder-air mixture 13.

In the exemplary embodiment, a cyclone 15 is accommodated in a container cover 14, having a horizontal delivery passage 16 for the powder-air mixture coming from the reservoir and having an upper opening 17 forming a communication path to the atmosphere for eliminating the air constituents of the powder-air mixture. The dosing container 3 also comprises a powder chamber 20 having a lower powder discharge 28 that is covered by a cover bell 29. The floor of the powder chamber 20 is formed by the fluidization means 1 1 that comprises a fluidization floor 31 having fluidization air input 32 at the under side thereof. A dosing chamber 34 having a lateral dosing air input 35 is provided under this fluidization means, a fine-pore, gas-permeable dosing cartridge 36 being accommodated in the chamber 34. The dosing chamber 34 is followed by the conveyor means 13 that comprises an injector 38 having an injector air input 39 and exit 40 for the dosed powder-air mixture to the allocated powder coating apparatus. A powder level display 21 is provided in the powder chamber 20, this being accomplished in the exemplary embodiment as a pneumatic level monitoring having a pressure pipe 22 and a diaphragm 23 in the cross section of this pipe at the lower, free end thereof. In addition, the dosing container 3 is provided with mounts 25, 26 in order to be able to fasten it in the proximity of the work station, for example to a compartment wall.

The described apparatus works in the following way: the powder-air mixture coming from the reservoir 1 flows tangentially into the cyclone 15. A primary eddy thereby arises at the inside cyclone wall with which the heavy powder particles are separated in downward direction under the influence of the centrifugal acceleration, whereas the lightweight air particles are carried upward in a narrow, ascending secondary eddy and are eliminated through the opening 17. The powder is subsequently collected in the powder chamber 20 and is fluidized by the fluidization air flowing through the fluidization floor 31. The powder-air mixture produced is downwardly withdrawn through the powder discharge 28 by the suction effect of the injector 38. The powder-air mixture thereby flows through the dosing chamber 34 along the dosing cartridge 36 through whose fine-pore, gas-permeable wall further air can be added to the powder-air mixture via the dosing air input 35; i.e. the powder-air mixture can be "diluted" further. The conveying air entering through the injector air input 39 defines the quantity of powder-air mixture that is conveyed to the allocated powder coating apparatus and the powder-air stream is conveyed in a known way to the closely proximate coating apparatus.

During operation, the powder level in the powder chamber 20 is indicated by the powder level display 21. In case of a pneumatic level monitoring, the diaphragm 23 in the end of the pressure pipe 22 thereby acquires the level height in accord with the weight of the powder acting on it. With prescribed values for minimum and maximum filling level and on the basis of the measured powder level, the conveying of the powder-air mixture from the reservoir 1 to the dosing container 3 can be regulated by means of a minimum/maximum control means 24 (FIG. 1) in accord with the calculated differences between measured height and height limit values.

A preferred embodiment of the invention is set forth by way of example in the above description. However, other embodiments of the invention are also conceivable.

The sequence—of first fluidizing the powder that remains after the air has been eliminated and subsequently dosing the produced powder-air mixture can also be reversed on the basis of a corresponding arrangement of the dosing means 12 following the separation means 10 and preceding the fluidization means 11. This arrangement yields an especially exact dosing for specific applications.

Further, the powder level display 21 in the powder chamber 20 can also ensue capacitatively, inductively, mechanically or optoelectrically on the basis of a transparent container cylinder. Further, the dosed powder-air mixture can be conveyed to the allocated powder-coating apparatus with a worm, a star feeder or the like instead of being conveyed thereto with an injector.

In an alternative embodiment of the invention, the dosing container 3 is directly connected to the powder coating apparatus without an intervening conveyor line 4. This is particularly called for given permanently installed coating apparatus. In this case, it is also possible to accommodate the high-voltage generator of the electrostatic powder coating apparatus in or at the dosing container 3.

Over and above this, all component parts of the dosing container can be pluggably or screwably connected to one another.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim as our invention:

1. An apparatus for feeding powder coating apparatus with a powder-air mixture, comprising a powder reservoir having first fluidization means for fluidizing powder and first conveying means for conveying the powder-air mixture thereby arising to the powder coating apparatus via an intermediate dosing container having separating means for separating the air from the incoming powder-air mixture, second fluidization means for fluidizing the remaining powder, dosing means for dosing the newly produced powder-air mixture and second conveying means for continuous delivery of the dosed powder-air mixture to said powder coating apparatus, said separating means comprising a cyclone formed in a cover of said intermediate dosing container, a powder supply passage for said powder-air mixture coming from the powder reservoir and an opening forming a communication path to the atmosphere for eliminating air constituents of the incoming powder-air mixture, said second fluidization means being accommodated in a floor region of said intermediate dosing container and comprising a fluidization floor having a fluidization air entry extending through said floor, wherein said dosing means is downstream of said fluidization floor and comprises a powder dosing chamber wherein a dosing cartridge having dosing air input and finely distributed dosing air discharge is arranged for enriching said powder-air mixture with additional air.

2. An apparatus according to claim 1, wherein said conveyor means downstream of said dosing chamber and said fluidization floor comprises an injector having an injector air input and powder discharge, said dosed powder-air mixture being conveyed to said powder coating apparatus via this discharge.

3. An apparatus according to claim 1, wherein a powder-level-indicating device is provided in a powder chamber between said cover and floor of said dosing container.

4. An apparatus according to claim 3, wherein said powder-level-indicating device comprises a minimum/-maximum control means for conveying the powder coming from said reservoir.

5. An apparatus for feeding powder coating apparatus with a powder-air mixture, comprising a powder reservoir having first fluidization means for fluidizing powder and first conveying means for conveying the powder-air mixture thereby arising to the powder coating apparatus via an intermediate dosing container having separating means for separating the air from the incoming powder-air mixture, second fluidization means for fluidizing the remaining powder, dosing means for dosing the newly produced powder-air mixture and second conveying means for continuous delivery of the dosed powder-air mixture to said powder coating apparatus, wherein, said second fluidization means is accommodated in a floor region of said intermediate dosing container and comprises a fluidization floor having a fluidization air entry extending through said floor, and wherein, said dosing means is downstream of said fluidization floor and comprises a dosing chamber wherein a dosing cartridge having dosing air input and finely distributed dosing air discharge is arranged for enriching said powder-air mixture with additional air.

6. An apparatus according to claim 5, wherein said conveyor means downstream of said dosing chamber and said fluidization floor comprises an injector having an injector air input and powder discharge, said dosed powder-air mixture being conveyed to said powder coating apparatus via said powder discharge.

7. An apparatus according to claim 5, wherein a powder-level-indicating device is provided in a powder chamber between said cover and floor of said dosing container.

8. An apparatus according to claim 7, wherein said powder-level-indicating device comprises a minimum/-maximum control means for conveying the powder coming from said reservoir.

9. The apparatus according to claim 5, wherein said separating means comprises a cyclone formed in a cover of said intermediate dosing container, a powder delivery passage for said powder-air mixture coming from the powder reservoir and an opening to the atmosphere for eliminated air.

* * * * *